United States Patent [19]

Kamin

[11] 4,161,750

[45] Jul. 17, 1979

[54] VIDEO ALARM SYSTEMS

[75] Inventor: Gerhard R. Kamin, Traisa, Fed. Rep. of Germany

[73] Assignee: Robert Bosch GmbH, Stuttgart, Fed. Rep. of Germany

[21] Appl. No.: 885,455

[22] Filed: Mar. 10, 1978

[30] Foreign Application Priority Data

Mar. 12, 1977 [DE] Fed. Rep. of Germany ....... 2710883

[51] Int. Cl.[2] ............................................ H04N 7/18

[52] U.S. Cl. .................................. 358/105; 340/541; 340/551

[58] Field of Search ................ 358/105, 108; 340/541, 340/551, 552, 561, 565

[56] References Cited

U.S. PATENT DOCUMENTS 3,781,468 12/1973 Chomet et al. ..................... 358/105

4,090,221 5/1978 Connor ............................... 358/105

*Primary Examiner*—Robert L. Griffin

*Assistant Examiner*—Joseph A. Orsino, Jr.

*Attorney, Agent, or Firm*—Littlepage, Quaintance, Murphy, Richardson and Webner

[57] ABSTRACT

In a video alarm system with digital evaluation the analog video signal generated by a television camera is converted into a binary signal by comparison with a threshold-value signal in an amplitude discriminator, and the binary signal is then evaluated, for example by summing. The threshold-value signal is in the form of an alternating voltage which sweeps over the black-to-white amplitude range of the picture information containing portion of the video signal a plurality of times during each line period. Compensation is provided for fluctuations of overall brightness in the scene from which the video signal is derived by inverting the binary signal to be evaluated during alternate sections of each line period.

10 Claims, 5 Drawing Figures

VIDEO ALARM SYSTEMS

FIELD OF THE INVENTION

This invention relates to an alarm system of the kind wherein an analog video signal produced by a television camera is descriminated to detect a movement or change in the field of view monitored by the television camera.

Prior Art

In a known system of this kind described in German patent specification No. 20 02 478, the analog video signal is first converted into a binary signal whose value depends upon whether or not the level of a threshold-value signal is exceeded by the video signal, for example a transition from binary low (L) to binary high (H) takes place in the binary signal when the level of the video signal exceeds the level of the threshold-value signal and vice versa, and then the binary signal is evaluated according to a predetermined criterion to determine whether or not to raise an alarm.

This system has the disadvantage, however, that the level of the threshold-value signal is constant. Thus fluctuations in the overall brightness level of the video signal, resulting for example from a change in the strength of daylight on the scene, may be interpreted as relevant to an alarm, and trip an alarm in undesired fashion. A further disadvantage is that in the known system the amount of binary information provided and thus the sensitivity of the discrimination depends on the location of the television camera, since for any given threshold level localised brightness changes which remain above or below the threshold level will not be detected. Thus for a mean grey threshold level only dark objects against a bright background or bright objects against a dark background can be detected.

It is therefore an object of the invention to provide a video alarm system which has improved characteristics in respect of the above disadvantages of the prior art.

SUMMARY OF THE INVENTION

According to the present invention there is provided an alarm system of the kind wherein an analog video signal produced by a television camera is discriminated to detect a movement or change in the field of view monitored by the television camera, the system comprising means for generating a threshold-value signal, means for converting the video signal provided by the camera into a binary signal whose value depends upon whether or not the level of the threshold-value signal is exceeded by the video signal, and means for evaluating the binary signal according to a predetermined criterion to determine whether or not to raise an alarm, wherein the threshold-value signal is an alternating signal whose frequency is related in predetermined manner to the horizontal frequency of the video signal, and whose level swings at least between the white and black values of the video signal at least once during each line period of the latter.

The invention has the advantage that, as a result of the alternating threshold-value signal, the sensitivity of the video signal discrimination is substantially less dependent on the location of the camera since the video signal intersects the threshold-value level at least once in each line period.

It is especially advantageous that the binary signal be inverted at predetermined intervals so as to at least partially compensate for fluctuations of basic brightness which are irrelevant to an alarm.

DESCRIPTION OF THE PREFERRED EMBODIMENT

Figure 1:
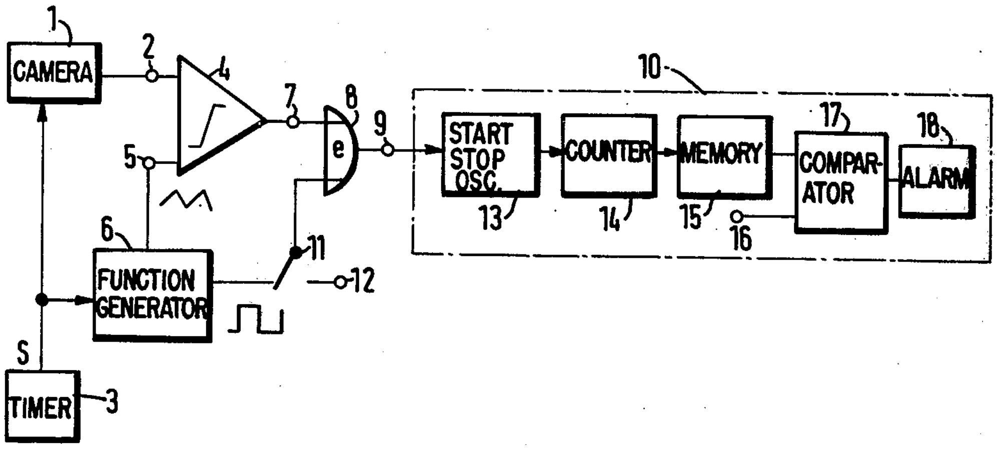
FIG. 1 is a block circuit diagram of an embodiment of an alarm system according to the invention.

In the block circuit diagram of FIG. 1, a television camera 1 directed at a scene or object to be monitored generates an analog video signal which is taken off at a terminal 2, the television camera 1 being synchronised by a synchronising signal S generated by a timer 3. The analog video signal is applied to one input of a comparator 4 whose other input is connected to the output terminal 5 of a function-generator 6. The function-generator 6 is also synchronised by the synchronising signal S of the timer 3. The signal fed via the terminal 5 to the comparator 4 is herein called the threshold-value signal. As a result of the comparison, a binary signal is provided at the output terminal 7 of the comparator 4, the value of the binary signal at any instant depending upon whether or not the level of the threshold-value signal is exceeded by the level of the analog video signal at the moment of comparison. In the present case it is assumed that the binary signal is at a high level (H) when the video signal exceeds the threshold-value signal and at a low level (L) when the opposite is the case. The binary signal is passed via an exclusive OR 8 to the input terminal 9 of a device 10 for evaluating the binary video signal. One of the inputs of the exclusive OR 8 is selectively connectable via the contact path of a change-over switch 11 either to a second output of the function-generator 6 which provides an alternating sequence of binary L and H levels, or to a terminal 12 which provides a constant potential at binary L level. The purpose of the provision for selection will be explained later, but for the moment it will be assumed that the input of the gate 8 is connected to the terminal 12. The device 10 may be variously constructed to correspond to any one or more of a number of alarm-tripping criteria. In the present embodiment it is assumed that an L to H transition of the binary signal present at the terminal 9 starts a start-stop oscillator 13 and an H to L transition stops the oscillator. The total number of pulses delivered by the oscillator 13 is counted by a counter 14 in respect of each complete television picture, whereby the total count at the end of each such period represents the sum of the periods when the binary signal is at H. The result of each such count is placed in a store 15 after the end of the relevant television picture, and compared in a comparator 17 with a reference value present at a terminal 16 and corresponding to the total count per picture for an undisturbed scene being monitored. If the comparator 17 detects a predetermined difference between the reference value and the actual counted value, an alarm is tripped in an alarm-generator 18.

Figure 2:
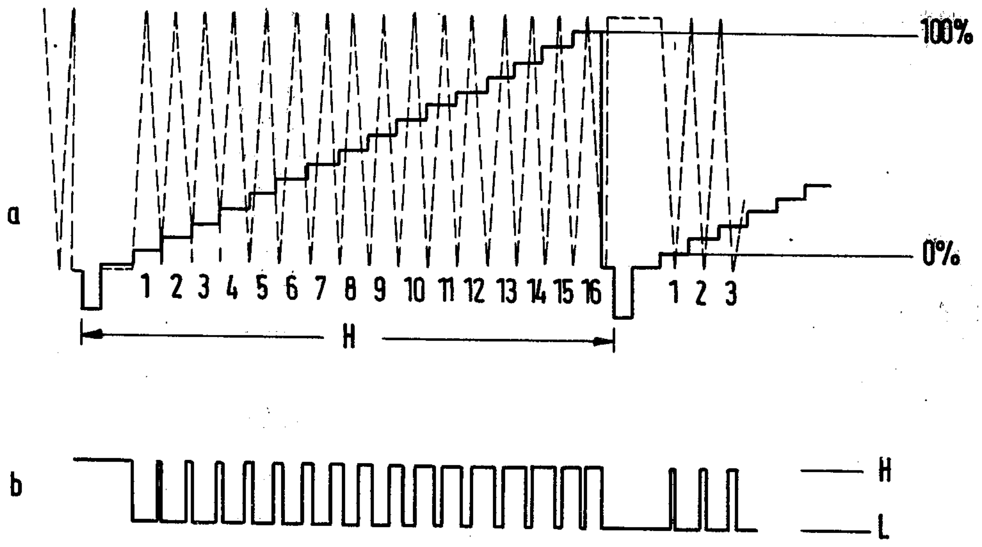
FIGS. 2 and 3 are voltage-time diagrams for the purpose of explaining the operation of the embodiment of FIG. 1.

The threshold-value signal fed to the comparator 4 is an alternating signal and has for example a triangular form as illustrated by the dashed line in FIG. 2*a*. The full line of FIG. 2*a* shows one line period H of a progressively increasing step-shaped analog video signal assumed to be applied at the terminal 2, this step-shaped signal being shown for simplicity only and not being intended to represent the form of a video signal which would be obtained in actual practice. The frequency of the triangular threshold-value signal present at the terminal 5 is tightly coupled to the horizontal frequency of the video signal. In the present embodiment, there are 16 cycles of the triangular threshold-value signal in the picture information containing region of each line period. The sections of lines associated with each cycle of the threshold-value signal define a respective "field" of the television picture, which may thus be regarded as subdivided into sixteen vertical striplike "fields" of equal width. The amplitude range of the triangular threshold-value signal is chosen to be at least as great as the video signal amplitude range between the extreme values of white (100%) and black (0%) of the picture information containing portion thereof, and is preferably greater than this range as shown in FIG. 2. The phase of the threshold-value signal is rotated through 180° in consecutive lines, as will be described. Given that the signals shown in FIG. 2*a* are applied at the input terminals 2 and 5 of the comparator 4, the binary signal shown in FIG. 2*b* is provided at the terminal 7. During periods in which the level of the video signal is greater than the level of the threshold-value signal, the binary signal assumes the logic level H. On the contrary, when the level of the video signal is less than the level of the threshold-value signal, the logic level of the binary signal becomes L.

As mentioned above, the counter 14 gives a measure of all the portions of the video signal lying above the level of the threshold-value signal. The alternating form of the threshold-value signal ensures that the threshold-value signal is intersected at least once in every "field" portion of each line of the video signal, i.e., at least sixteen times per line in the present case. This provides abundant binary information for evaluation and provides a sensitivity of discrimination substantially independent of the location of the camera.

If the overall brightness in the scene being monitored changes, the average amplitude of the video signal will also change. Thus the total time in each television picture for which the binary signal assumes the H level also changes, so that the evaluator device 10 to which the binary signal is passed may decide on an alarm condition. Such changes of overall brightness may arise for example from fluctuations due to the time of day and weather conditions when an alarm system is being operated out of doors, and are usually considered to be irrelevant to an alarm.

Figure 3:
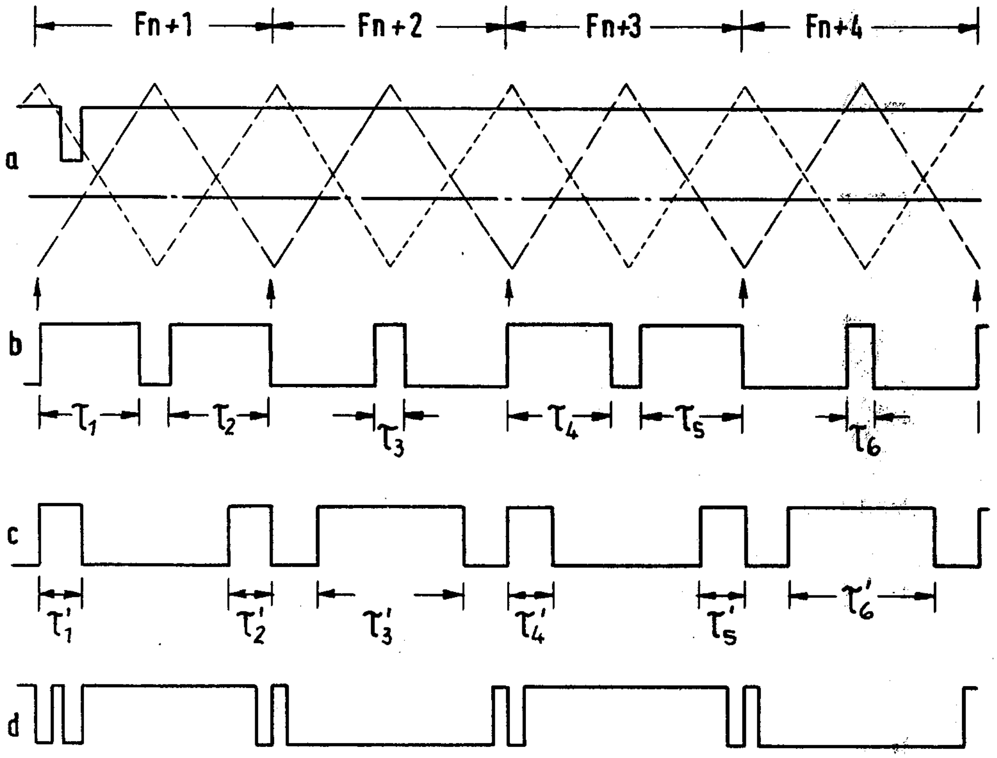

The voltage-time diagrams shown in FIG. 3 serve to explain the compensation for fluctuations in basic brightness which are irrelevant to an alarm, which compensation is achieved by switching the contact path of the switch 11 to the second output of the function generator 6. The waveforms of FIG. 3 embrace the duration of four consecutive "field" sections $F_{n+1}$ to $F_{n+4}$ of a video line. The full line of FIG. 3*a* is intended to show the analog video signal, and the line with long dashes the threshold-value signal. The corresponding binary signal obtained at the output of the exclusive OR 8 is illustrated in FIG. 3*b* when the contact path of the changeover switch 11 is connected to the output of the function-generator 6 as assumed. The function-generator 6 provides to the gate 8 a pulse signal of half the frequency as the triangular threshold-value signal, consecutive pulses being coincident with alternate "field" sections of the video line. During the sections of line $F_{n+1}$ and $F_{n+3}$ (and the corresponding vertically aligned sections of all of the other lines) the output of the generator 6 is assumed to be L, so that for the alternate "fields" containing these sections the binary signal formed from the video signal in the manner already described is passed unchanged through the gate 8. Such "fields" will be referred to as "normally discriminated fields." However, the binary signal is inverted by the action of the gate 8 during the sections of line $F_{n+2}$ and $F_{n+4}$ when the output of 6 is H. The "fields" in which such inversion occurs will be referred to as "inversely discriminated fields." This alternate inversion by sections of line of the binary signal provides at least partial compensation for fluctuations of basic brightness which are irrelevant to an alarm.

For the purpose of clarification, let it be assumed that the full-line analog video signal in FIG. 3*a* drops to the position shown in dash-dotted line as a result of a drop in overall brightness. The binary signal of FIG. 3*c* is in this case obtained at the output 9 of the exclusive OR 8. However, provided there is an even number of "fields," the sum of the periods at H level will remain approximately constant when there is a change of overall brightness in the video signal, since the decrease in pulse widths in the normally discriminated "fields" will be at least partially compensated by an increase in the pulse widths in the inversely discriminated "fields." Thus the sum of the intervals $\tau_1$ to $\tau_6$ of FIG. 3*b* is approximately equal to the sum of the intervals $\tau'_1$ to $\tau'_6$ in FIG. 3*c*. The monitoring device 10 which evaluates the pulses will therefore not decide on an alarm condition so readily as in the case where all the "fields" are normally discriminated.

The preceding discussion assumed that for any given brightness of the scene being monitored the amplitude of the video signal was substantially constant over the scene as a whole, and such a case would of course give perfect brightness compensation since any change in duration of binary H level in respect of each normally discriminated "field" would be precisely compensated by an exactly equal and opposite change in duration of binary H level in respect of each inversely discriminated "field." However, this is of course a gross simplification since in actual practice the amplitude of the video signal will vary considerably over the scene for any given level of illumination, and a fluctuation of the overall brightness of a scene being monitored does not change the absolute value of the video signal at all points by the same amount. For example, in an outdoor situation when a cloud passes in front of the sum, the amplitude of the video signal corresponding to the parts of the scene previously directly illuminated by the sunlight may drop by 50% or more, whereas the amplitude of the video signal corresponding to parts of the scene previously in shadow may only drop by 10%. Thus, using the triangular threshold value signal described, the change in the duration of the periods of binary H level resulting from the drop in video signal amplitude from the previously directly illuminated parts is much greater than the change in the duration of the periods of binary H level resulting from the drop in video signal amplitude from the previously shadowed areas. The result is that if the brighter areas of the picture tend to predominate in the normally discriminated "fields" and the darker areas tend to predominate in the inversely discriminated "fields," or vice versa, the brightness compensation will be imperfect since the total change in H level in respect of the brighter areas will not be adequately compensated by an opposite change in H level in respect of the darker areas.

In such case a form of alternating threshold-value signal can be used which is not linear as in the case described above, but which consists, for example, of an alternately rising and falling e function. In such a case the lower the amplitude of the video signal the smaller the change therein which is required to effect a given change in binary H level. In this way for a given change in overall brightness the total change in binary H level in respect of each "field" can be made substantially more equal than in the case of the triangular waveform, despite different average brightnesses of the "fields," so that better brightness compensation is achieve.

In general, however, the triangular waveform will be adequate since in most of the common situations which are encountered in practice the average brightness in each "field" will be the same, or at least the average brightness in each normally discriminated "field" will be approximately the same as the average brightness in a respective inversely discriminated "field" somewhere else in the picture. Thus for any change in overall brightness the total duration of binary signal at H level from all of the normally discriminated "fields" will change in the opposite direction and by approximately the same amount as the total duration of binary signal at H level from all the inversely discriminated "fields."

In either case, using a triangular or exponential threshold-value signal, local changes in brightness, caused for example by an intruder, will in general affect only one or at most a small number of "fields" at one time, and the average brightness change induced in each "field" affected will not in general be compensated by an equivalent change in brightness in a corresponding "field" which is oppositely discriminated. Thus an alarm will be raised.

It will be appreciated that the greater the number of "fields" which are alternately normally and inversely discriminated, i.e., the narrower the "fields," the greater the accuracy of compensation for overall brightness changes since the greater the similarity between the picture content and brightness of adjacent oppositely discriminated "fields." However, a large number of narrow "fields" has the danger that an intruder may cause a sufficiently similar brightness change to a sufficient number of adjacent "fields" for adequate compensation of the brightness change by the mechanism described so that the intruder is not detected. Thus, except in the circumstances mentioned below, each "field" must be of relatively large width and the precise number chosen will be determined by the circumstances of the particular application.

In order to render a particular area of the television picture relatively more sensitive to localised brightness changes than other areas, a number of immediately adjacent "fields" can all be discriminated in the same way, with the remaining "fields" alternating in the type of discrimination as before. Thus any localised brightness change in the area concerned cannot be compensated, whereas a similar brightness change in another part of the picture will be compensated if the "fields" are narrow enough. This technique is useful if it is required to detect changes in only a part of the scene under surveillance, since the parts of the scene not of interest can be provided with many narrow alternately discriminated "fields" so as to compensate virtually any changes occurring in those areas, whereas the "fields" in the part of the scene of interest can all be discriminated in the same manner. If desired the selected area can be compensated in respect of overall brightness changes by providing a corresponding number of immediately adjacent "fields" in another part of the picture which are oppositely discriminated to the selected area, or merely by providing an excess of oppositely discriminated fields in the remaining part of the picture equal in total area to the selected area. In this technique of rendering a selected area relatively more sensitive to brightness changes than another, the selected area within which the "fields" are all subject to the same type of discrimination need not extend the full height of each field, and can be of any chosen shape.

It is to be understood that although in the above embodiment the periods of "normal" and "inverse" discrimination alternate in synchronism with the cycles of the threshold-value signal, this is not in general necessary. The inversions can for example occur alternately in respect of successive fractions or multiples of the alternating threshold, or in respect of successive groups of lines (giving horizontal "fields"). Provided that part of the summing period of the counter 14, in the present case the duration of a complete television picture, is discriminated "normally" and part "inversely" any changes in overall brightness will affect the total binary output at H level from each part in opposite directions so that at least partial compensation is achieved.

Referring again to FIG. 3, the analog video signal is shown as comprising a negative-going pulse in the section of line $F_{n+1}$ of FIG. 3*a*, such pulse not being detected by the threshold-value signal shown by the line with long dashes. In order that regard may also be had to such changes in the video signal which are perhaps relevant to an alarm, the threshold-value signal is reversed in polarity on alternate lines, as shown by the line with the short dashes. The corresponding binary signal at the output of the exclusive OR 8 for this reversed polarity threshold-value signal is illustrated in FIG. 3.

Figure 4:
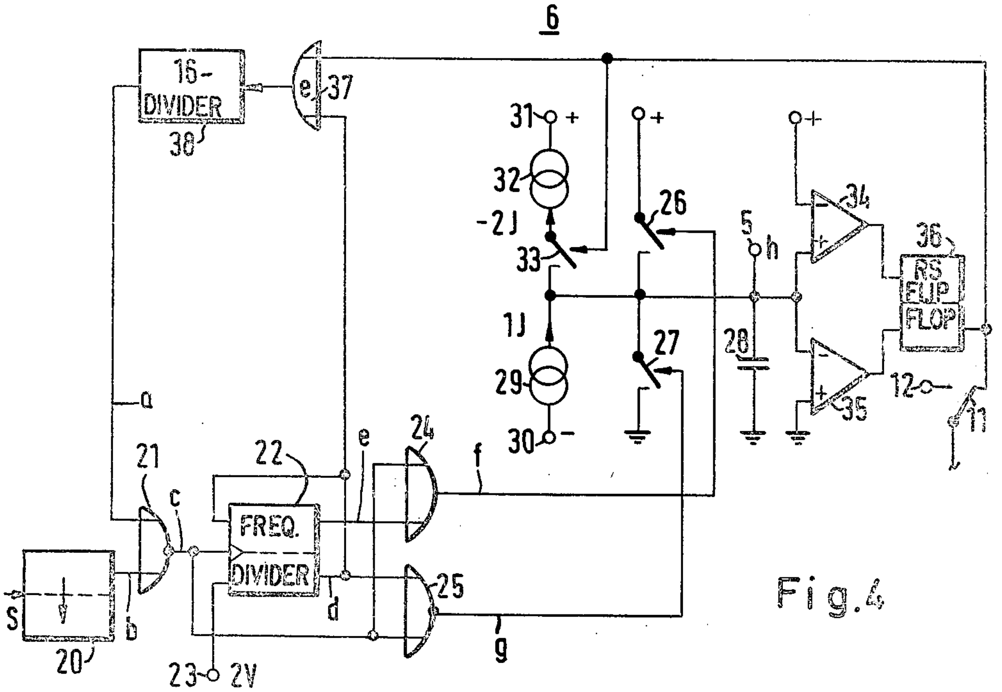
FIG. 4 is a detailed diagram of a circuit for generating the threshold-value signal used in the embodiment of FIG. 1, and FIG. 5 are voltage-time diagrams for the purpose of explaining the operation of the circuit diagram of FIG. 4.
Figure 5:
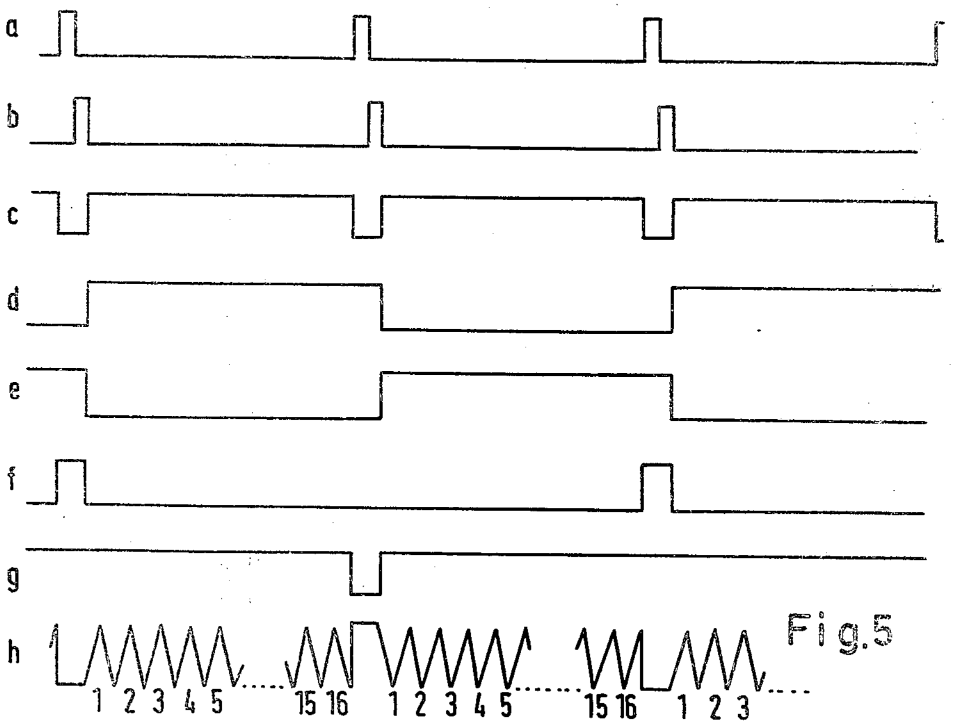

FIG. 4 is a circuit diagram of a practical example of the function-generator illustrated as a block in FIG. 1. The synchronising signal S generated in the timer 3 is fed to a monoflop 20, the pulse signal shown in FIG. 5*b* being obtained at the output of the monoflop 20. The rear flank of this pulse signal defines the start of discrimination in each line period. The pulse signal is fed via a NOR gate 21 to the timing input of a frequency-divider 22. The phase position of the frequency-divider 22 is fixed by a pulse signal at half the vertical frequency 2V present at a terminal 23. The mutually inverse pulse signals which are obtained at the outputs of the frequency-divider 22 (FIGS. 5*e* and 5*d*) are logically combined by an OR gate 24 and a NOR gate 25 with the pulse signal obtained at the output of the NOR gate 21 for the purpose of deriving two control signals (FIG. 5*f* and FIG. 5*g*) for two controlled switches 26 and 27. The controlled switches 26 and 27 are connected to one plate of a charge condenser 28 whose other plate goes to earth potential. The charge condenser 28 is linearly charged up by the current 1I of a first current-source 29 which is connected to a negative operating voltage source 30. The charge stored in the charge condenser 28 is linearly discharged again by an opposite current −2I from a second current-source 32 connected to a positive operating voltage source 31. The rate of charge and discharge is controlled via the contact path of a controlled change-over switch 33. The control voltage for the contact path of the change-over switch 33 is derived by two comparators 34 and 35, after which an RS flip-flop 36 is connected. The RS flip-flop 36 is set and reset in dependence on the voltage across the charge condenser 28, which voltage switches over the comparator 34 at an upper limit, and the comparator 35 at a lower limit. The triangular signal of FIG. 5*h* is obtained across the charge condenser 28, and is fed via the terminal 5 as the threshold-value signal to the comparator 4. The RS flip-flop 36 reshapes the triangular signal into a rectangular signal. This signal is passed on via the contact path of the change-over switch 11 to the exclusive OR 8, and as a control signal to the contact path of the controlled switch 33. For the purpose of frequency-coupling the threshold-value signal thus generated, the signal which is obtained at the output of the RS flip-flop 36 is logically combined in a further exclusive OR 37 with the pulse signal (FIG. 5*d*) obtained at the output of the frequency-divider 22, and fed to a 16-divider 38. The horizontal frequency signal shown in FIG. 5*a* obtained at the output of the 16-divider 38, is logically combined in the NOR gate 21 with the pulse signal of FIG. 5*b*.

The action of the circuit hitherto described in principle corresponds to that of a start-stop oscillator. The output signals of this start-stop oscillator are accurately defined as regards position with reference to the horizontal frequency of the video signal.

Switching over the "fields" with inverse discrimination to normal discrimination by connecting the contact path of the switch 11 to the terminal 12 makes the system very highly sensitive due to the removal of compensation, so that in closed rooms provided with constant lighting regard may be had to an additional factor relevant to an alarm.

I claim:

1. An alarm system of the kind wherein an analog video signal produced by a television camera is discriminated to detect a movement or change in the field of view monitored by the television camera, the system comprising means for generating a threshold-value signal, means for converting the video signal provided by the camera into a binary signal whose value depends upon whether or not the level of the threshold-value signal is exceeded by the video signal, and means for evaluating the binary signal according to a predetermined criterion to determine whether or not to raise an alarm, wherein the threshold-value signal is an alternating signal whose frequency is related in predetermined manner to the horizontal frequency of the video signal, and whose level swings at least between the white and black values of the video signal at least once during each line period of the latter.

2. A system according to claim 1, in which the threshold-value signal is a sawtooth signal.

3. A system according to claim 2, in which the sawtooth signal is a triangular signal.

4. A system according to claim 1, in which the threshold-value signal is a non-linear signal.

5. A system according to claim 4, in which the non-linear signal is in the form of an exponential function.

6. A system according to claim 1, in which the frequency of the threshold-value signal is a multiple of the horizontal frequency of the video signal.

7. A system according to claim 6, in which the threshold-value signal is displaced in phase by 180° in consecutive line periods of the video signal.

8. A system according to claim 1, further including means for inverting the binary signal during predetermined periods so as to provide at least partial compensation for overall brightness changes in the field of view monitored by the camera.

9. A system according to claim 6, further including means for inverting the binary signal during predetermined periods so as to provide at least partial compensation for overall brightness changes in the field of view monitored by the camera.

10. A system according to claim 9, in which the binary signal is inverted during alternate cycles of the threshold-value signal, at least in respect of a part of each of a plurality of line periods of the video signal.

* * * * *